United States Patent
Ausseresse

(10) Patent No.: US 10,587,189 B1
(45) Date of Patent: Mar. 10, 2020

(54) REGULATED SWITCHED-CAPACITOR CONVERTER

(71) Applicant: Infineon Technologies Austria AG, Villach (AT)

(72) Inventor: Pierrick Ausseresse, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/380,409

(22) Filed: Apr. 10, 2019

(51) Int. Cl.
*H02M 3/07* (2006.01)
*H02M 1/00* (2006.01)
*H02M 1/15* (2006.01)

(52) U.S. Cl.
CPC ............... *H02M 3/07* (2013.01); *H02M 1/15* (2013.01); *H02M 2001/0048* (2013.01)

(58) Field of Classification Search
CPC ... H02M 3/07; H02M 1/15; H02M 2001/0048
See application file for complete search history.

(56) References Cited

U.S. PATENT DOCUMENTS

| 9,497,851 | B2 * | 11/2016 | Melanson | H05B 33/0854 |
| 9,531,257 | B2 * | 12/2016 | Zhang | H02M 1/4225 |
| 10,404,162 | B2 * | 9/2019 | Giuliano | H02M 3/158 |

OTHER PUBLICATIONS

Lei, Yutian, et al., "Split-Phase Control: Achieving Complete Soft-Charging Operation of a Dickson Switched-Capacitor Converter", IEEE Transactions on Power Electronics, vol. 31, No. 01, Jan. 2016, pp. 770-782.
Seo, Gab-Su, et al., "A 95%-Efficient 48 V-to-1 V/10 A VRM Hybrid Converter", 2018 IEEE Energy Conversion Congress and Exposition (ECCE)—Reference found via Gan Talk by Rick Pierson, Oct. 7, 2018, accessed online at http://epc-co.com/epc/GaNTalk/Post/15043/A-95-Efficient-48-V-to-1-V-10-A-VRM-Hybrid-Converter on Nov. 21, 2018.

* cited by examiner

*Primary Examiner* — Dinh T Le
(74) *Attorney, Agent, or Firm* — Murphy, Bilak & Homiller, PLLC

(57) ABSTRACT

Circuits and methods are provided for voltage conversion within a variant switched-capacitor converter (SCC). The circuit topology of the variant SCC includes an adjustable converter that is interposed between a switch ladder and a rectifier of the variant SCC. The adjustable converter may be an inductor-based switching converter, e.g., a buck, boost, or buck/boost converter. The adjustable converter sets the output voltage of the variant SCC and sets a base current that flows through the adjustable converter. The overall output current is an amplified version of the base current. Because the base current is much lower than the overall output current, the adjustable converter may use a much smaller inductor than would be required by a voltage converter through which the entirety of the output current flows through an inductor.

19 Claims, 8 Drawing Sheets

REGULATED SWITCHED-CAPACITOR CONVERTER

TECHNICAL FIELD

The present application relates to a circuit topology for a hybrid switched-capacitor converter that provides a regulated output.

BACKGROUND

Switching direct-current (DC) to DC voltage converters are used in a variety of applications for converting power at an input voltage into power at a desired output voltage. Such voltage converters are used to power loads such as battery chargers, microprocessors, servers, computers, televisions, and many other electronic devices. Voltage converters may step an input voltage up or down but, for brevity and clarity of explanation, the following background description focuses on step-down converters.

Buck converters represent a common type of non-isolated step-down converter wherein an electronic switch converts an input DC voltage into an alternating-current (AC) voltage that is applied to an inductor. The switch and the inductor, together with some type of rectifier, serve to step down the input voltage and step up the input current, such that a lower voltage and a higher current is provided at the output of the converter. The output voltage (or current) may be regulated by adjusting a frequency and/or duty cycle with which the electronic switch is switched, so as to maintain a relatively constant voltage (or current) at the output. However, such converters suffer relatively high power losses in both the switching and in the inductor. In particular, the entirety of the output current must pass through the inductor. While the resistive losses of an inductor are preferably minimized, they cannot be eliminated and can lead to significant power losses for high output currents. Furthermore, the voltage drop across the inductor is proportional to its inductance, and a large inductance must be used to support buck converters with large step-down ratios. Hence, large, bulky, and expensive inductors are required to support high input-to-output voltage ratios, and high output currents flowing through such inductors. For these reasons, buck converters are typically avoided for applications that require large step-down ratios.

Switched-capacitor converters (SCCs), including converters based upon Dickson or similar charge pumps, use a series of electronic switches and capacitors to step down an input voltage. SCCs are typically more efficient than inductor-based buck converters for relatively high voltage step-down ratios, and do not require large magnetic components (e.g., inductors). However, conventional SCCs are only capable of providing discrete/fixed step-down ratios, e.g., 2:1, 3:2, 6:1, and are not amenable to regulation. Hence, conventional SCCs are not appropriate, at least on their own, for supplying power to loads that require a relatively constant voltage.

Converter circuit topologies and associated techniques are desired that are capable of regulating an output voltage while achieving high efficiency, having low converter impedance, and avoiding large magnetic or other components.

SUMMARY

According to an embodiment of a regulated switched-capacitor converter (SCC), the regulated SCC includes first and second I/O terminals, a rectifier coupled to the second I/O terminal, a first capacitor coupled between a first voltage node and a ground reference, a switch ladder, and a variable-voltage converter. The switch ladder is coupled between the first I/O terminal and the first voltage node, and comprises first and second switches, and a second capacitor. The first switch is coupled to the first capacitor at the first voltage node. The second switch is coupled to the first switch at a second voltage node, and is further coupled between the first I/O terminal and the first switch. The second capacitor is coupled between the second voltage node and a node of the rectifier. The variable-voltage converter is coupled between the first voltage node and the second I/O terminal, and is configured to provide a variable voltage drop therebetween. In preferred embodiments, the variable-voltage switching converter includes a switching power stage and an inductor, as typically included within a buck or boost converter.

According to an embodiment of a regulated SCC system, the system comprises the regulated SCC described above and a controller. The controller is configured to generate a first control signal for controlling the first switch, a second control signal for controlling the second switch, and a power-stage control signal for controlling the power stage of the variable-voltage switching converter. The power-stage control signal may be used to control the variable voltage drop across the variable-voltage switching converter, and may be used to regulate an output voltage of the regulated SCC system.

According to an embodiment, a method is provided for controlling a regulated SCC that comprises first and second input/output (I/O) terminals, a rectifier coupled to the second I/O terminal, a first capacitor coupled between a first voltage node and a reference voltage, a switch ladder, and a variable-voltage switching converter. The switch ladder includes first and second switches that are coupled between the first I/O terminal and the first voltage node, and a second capacitor, which couples an interconnection node of the first and second switches to a first node of the rectifier. The variable-voltage switching converter comprises a power stage and an inductor, and is coupled between the first voltage node and the second I/O terminal. The method comprises generating a first control signal for controlling conductivity of the first switch, generating a second control signal for controlling conductivity of the second switch, and generating a power-stage control signal for controlling conductivity of the power stage. The generated power-stage control signal may be used to regulate an output voltage of the regulated SCC.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description that follows.

DETAILED DESCRIPTION

Figure 1:
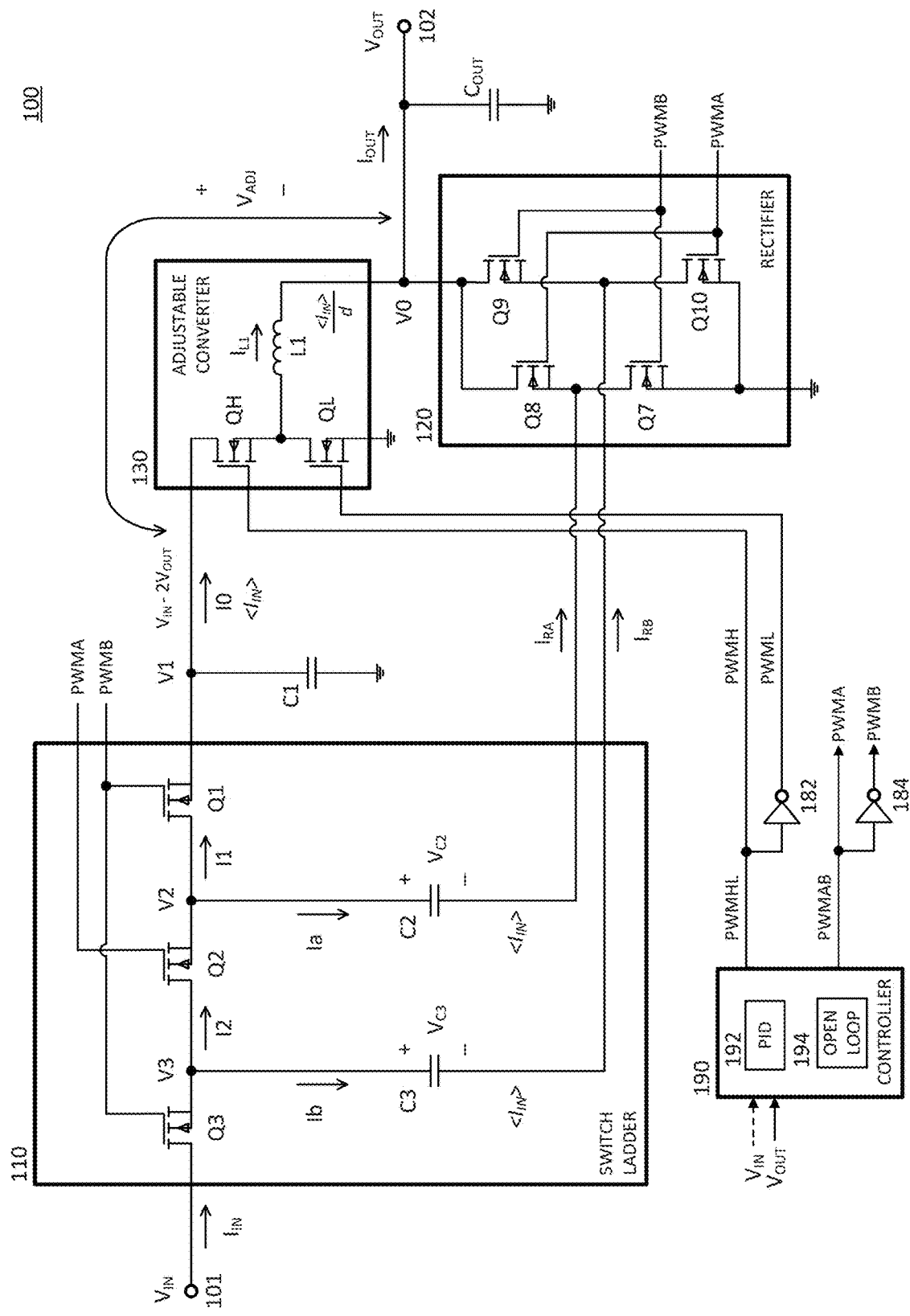
FIG. 1 illustrates a schematic diagram of a regulated switched-capacitor converter (SCC).

The embodiments described herein provide circuits and methods for voltage conversion using a variant switched-capacitor converter (SCC) topology based upon a charge pump. The variant SCCs described herein are not limited to discrete step-up or step-down ratios, as are conventional SCCs, and are dynamically adjustable such that a regulated output may be provided. These variant SCCs provide efficiencies, high currents and power densities similar to those of conventional SCCs, but also provide the regulation that is required by many loads, e.g., microprocessors or other digital circuits.

SCCs based upon charge pumps are becoming increasingly common due to their ability to support large voltage step-down (or up) ratios and high current throughput, while having high efficiency (low power loss) and requiring minimal area/volume for circuitry. Of particular note, conventional SCCs do not require bulky magnetic components, as do inductor-based buck and boost converters. In a common application for SCCs, data centers increasingly distribute a power bus having a 48V direct current (DC) voltage, which must be down converted for use by individual servers, processors, etc. An SCC may provide such down conversion and output, e.g., a 12V DC supply, an 8V DC supply, or a 6V DC supply. Many loads (e.g., processors) must be powered by an even lower voltage, and further require that the supplied power be regulated to maintain a relatively constant voltage even as the load current and the input voltage vary.

One technique for providing regulated power in a system using a conventional SCC is to couple an inductor-based buck converter between the SCC and the load. The buck converter, which is typically located at the point of load (POL), can provide a final voltage down conversion and voltage regulation. While the inductor in such a system is smaller than an inductor in a system relying entirely on a buck converter for the down conversion, such inductor is still relatively large, as it must be capable of carrying the entirety of the current that is being provided to the load. Furthermore and related to this, the resistive power loss of the inductor may be significant.

The recently-introduced hybrid Dickson converter provides a type of SCC having a step-down ratio that is not limited to discrete/integral ratios. The hybrid Dickson converter modifies a conventional SCC by coupling an inductor between a rectifier of the SCC and the load. In a further variation, the hybrid dual-inductor converter uses inductors to couple each of two sets of SCC legs (capacitors) to the load. Like the SCC/buck converter system described above, these hybrid converters suffer from the disadvantage that all of the output current must be carried through one or more inductors.

The embodiments described herein provide a variant SCC circuit topology wherein an adjustable voltage converter is coupled between an SCC switch ladder and a rectifier. The adjustable voltage converter may be, e.g., an inductor-based buck converter. The adjustable voltage converter can set the output voltage of the variant SCC to a value other than an fixed-ratio down conversion from an input voltage of the variant SCC. The voltage across the adjustable voltage converter may be dynamically adjusted to provide a regulated output voltage, e.g., by using a closed-loop controller to control the adjustable voltage converter. A switching frequency or duty cycle of the adjustable voltage converter may be independent from a switching frequency of switches within the SCC switch ladder and rectifier. Hence, an optimized frequency may be used for the switches in the switch ladder, e.g., to approach zero voltage or zero current switching, while the closed-loop controller independently varies another switching frequency or duty cycle to achieve a desired voltage across the adjustable voltage converter.

The adjustable voltage converter sets an output current level of the variant SCC, but does not carry all of the output current. For a step-down variant SCC having N switches in its switch ladder, only approximately $1/N^{th}$ of the output current flows through the adjustable voltage converter. In addition to only providing a portion of the voltage drop of the entire variant SCC, an inductor within the adjustable voltage converter only needs to carry a relatively small portion (approximately $1/N^{th}$) of the current output from the variant SCC. Because the size of an inductor is dependent upon the voltage across it and its power (current) rating, the low required inductor voltage and current allows the inductor to be relatively small as compared to other inductor-based voltage converters. Additionally, the low current through the inductor leads to relatively small resistive power losses of the inductor, as compared with voltage converter topologies in which the entire output current must flow through an inductor.

The embodiments are described below by way of particular examples of variant SCCs. These examples have the common feature that they include an adjustable voltage converter that is interposed between an SCC switch ladder and an SCC rectifier, wherein the adjustable voltage converter determines the output voltage of the variant SCC. Viewed alternatively, the adjustable voltage converter may be considered to provide an adjustable base current, and the SCC switch ladder and SCC rectifier effectively apply a current amplification (multiplication) to that base current. The descriptions focus primarily on a variant SCC that steps down an input voltage to provide a reduced output voltage, but the circuit topology of the variant SCCs also supports a step-up mode wherein the input and output terminals are swapped in function. It should be understood that the below examples are not meant to be limiting. Circuits and techniques that are well-known in the art are not described in detail, so as to avoid obscuring unique aspects of the invention. Features and aspects from the example embodiments may be combined or re-arranged, except where the context does not allow this.

The description continues below with an embodiment of a variant SCC having three switch stages in its switch ladder and a buck converter for its adjustable voltage converter, such that a voltage step-down of three or more is achieved. This topology is explained in detail using voltage and current waveforms. This is followed by descriptions of several alternative versions of the variant SCC, in which the number of switch stages is varied, different adjustable voltage converters are used, and the power flow is reversed so as to provide a voltage step-up. Finally, a method for operating the variant SCC is described.

Variant Switched-Capacitor Converter with Three Switch Stages

FIG. 1 illustrates an embodiment of a variant SCC 100 according to the invention. The variant SCC 100 comprises a switch ladder 110, a rectifier 120, an adjustable converter 130, and a controller 190. The adjustable converter 130 is interposed between the switch ladder 110 and the rectifier 120, and is provided current from the switch ladder 110 and a first capacitor C1. The variant SCC 100 further includes first and second terminals 101, 102 for connecting to an input power supply and an output load. For the illustrated operational mode, the first terminal 101 is connected to an input power supply having an input voltage $V_{IN}$, and the second terminal 102 provides an output voltage $V_{OUT}$ for a load of the variant SCC. (For ease of illustration, the input power supply and the load are not shown.) An output capacitor $C_{OUT}$ is coupled to the second (output) terminal 102, and filters the output voltage $V_{OUT}$.

The illustrated switch ladder 110 comprises three switches Q1, Q2, Q3 and two linking capacitors C2, C3, and is configured and controlled in much the same manner as within a conventional SCC, except for its rectifier connections. Switch control signals PWMA, PWMB alternately turn on the switches of a group 'A,' which includes switch Q2, and a group 'B,' which includes switches Q1 and Q3. In a first time interval, the group B switches are turned on and the group A switches are turned off, such that energy is transferred from $V_{IN}$ to capacitor C3 via switch Q3, and from capacitor C2 to capacitor C1 and the adjustable converter 130 via switch Q1. In a second time interval, the group A switch Q2 is turned on and the group B switches are turned off, so that energy is transferred from capacitor C3 to capacitor C2 via switch Q2. In addition to the positive currents flowing through the switches Q3, Q2, Q1 and to the capacitors C3, C2, the link capacitors C3, C2 provide currents $I_{RA}$, $I_{RB}$ to the rectifier 120. More particularly and as indicated in FIG. 1, each of the capacitors C3, C2 provides, after rectification, an average current $<I_{IN}>$ to the rectifier 120, wherein $<I_{IN}>$ is the average of the input current $I_{IN}$, i.e., $<I_{RA}>\approx<I_{RB}>\approx<I_{IN}>$. Because operation of the switch ladder 110 is similar to corresponding operation within a conventional SCC, further detail regarding operation of the switch ladder 110 is not provided.

In a significant difference relative to a conventional SCC, the output, denoted with the voltage V1 in FIG. 1, of the switch ladder 110 is not coupled directly to the rectifier output and the second (output) terminal 102, and does not directly supply an average current $<I_{IN}>$ to the second (output) terminal 102. Instead, the current I1 from the first switch Q1 charges the first capacitor C1, which serves as an energy store for the adjustable converter 130. The adjustable converter 130 then draws current I0 from the first capacitor C1 (and/or the first switch Q1), so as to achieve a desired voltage drop $V_{ADJ}$ thereacross. Provided the voltage V1 is sufficiently higher than the voltage $V_{OUT}$, a positive voltage $V_{ADJ}$ is dropped across the adjustable converter 130, such that the adjustable converter 130 can control the voltage $V_{OUT}$, e.g., so as to regulate the output voltage $V_{OUT}$ to a desired target voltage.

The illustrated adjustable converter 130 is a switching buck converter, and comprises a high-side switch QH, a low-side switch QL, and an inductor L1. Conductivity of the high and low-side switches QH, QL is controlled by control signals PWMH, PWML, which are provided by the controller 190 and an inverter 182. At most, one of the high and low-side switches QH, QL is set to conduct at a given time. For typical continuous conduction mode (CCM) operation, conductivity of the high and low-side switches QH, QL is alternated with a brief dead-time inserted when the switches are transitioning states, so as to ensure both switches are not on simultaneously, i.e., to avoid shoot-through. The control signals PWMH, PWML may be driven with a fixed frequency, but a variable duty cycle that determines the voltage drop $V_{ADJ}$ across the adjustable converter, or with a variable frequency and a fixed duty cycle, or with some combination thereof.

Figure 3:
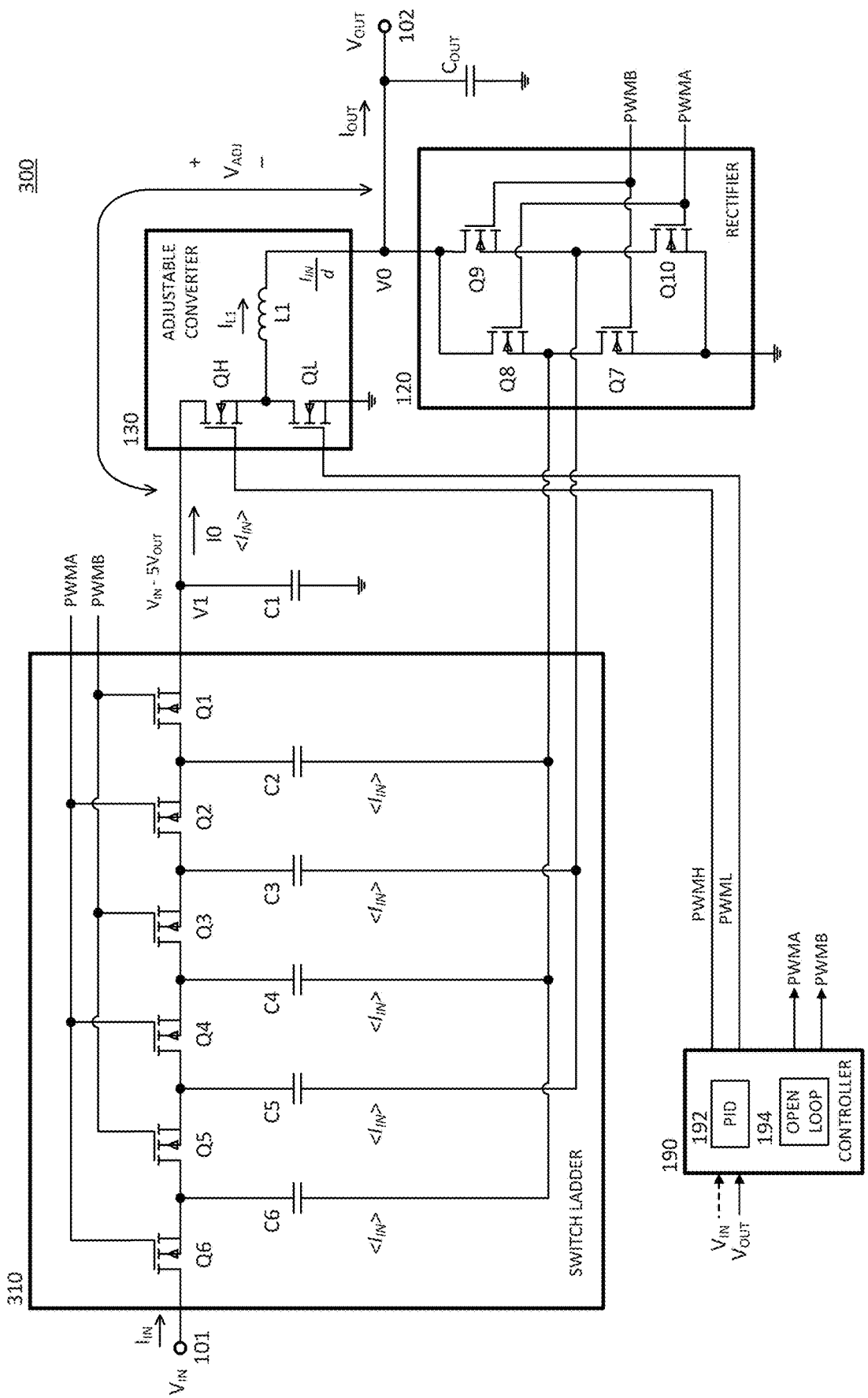
FIG. 3 illustrates a schematic diagram for an alternative regulated SCC having a different conversion ratio from the regulated SCC of FIG. 1.
Figure 5:
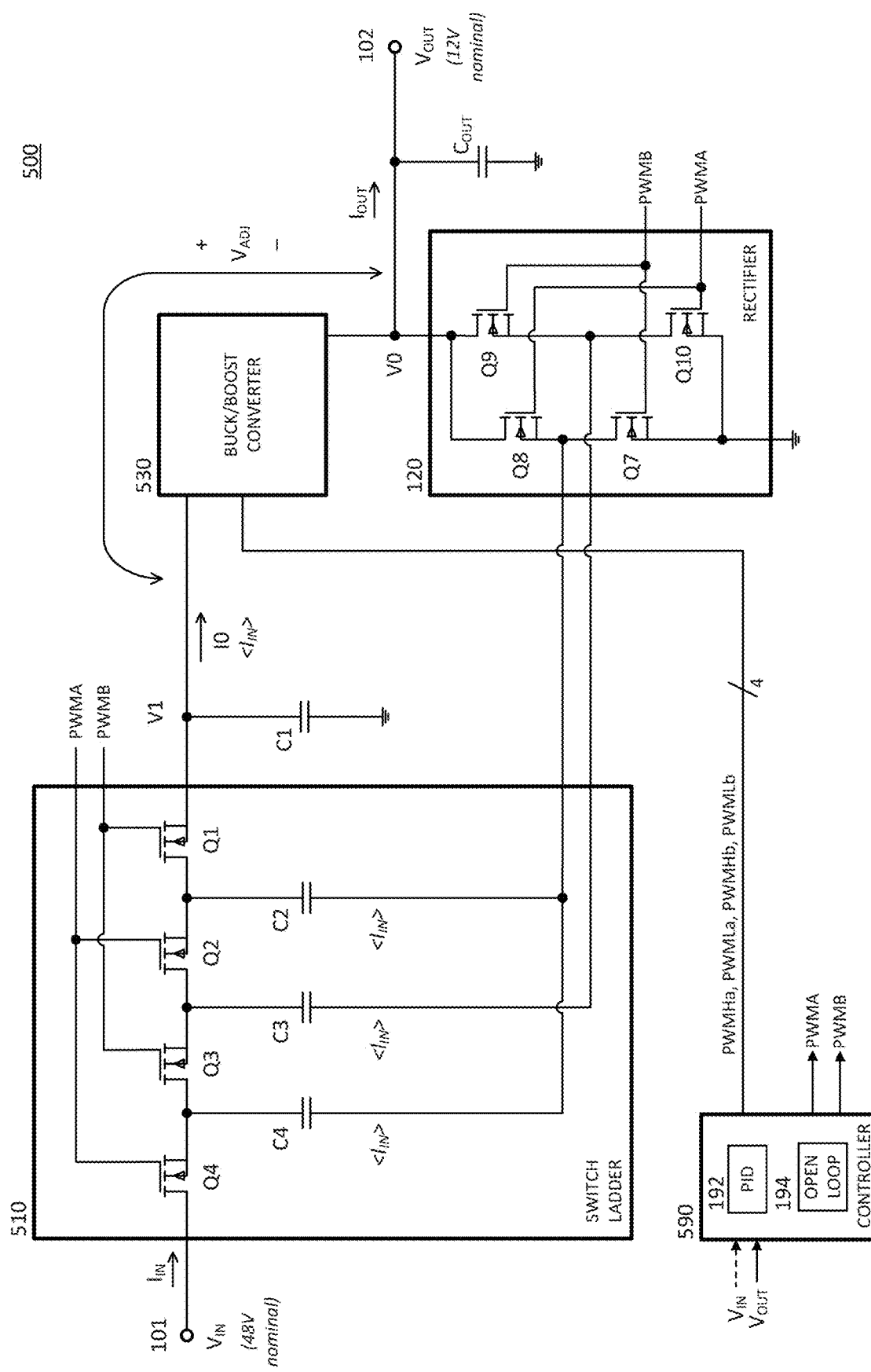
FIG. 5 illustrates a schematic diagram for an alternative regulated SCC having yet a different conversion ratio and using a buck/boost converter.
Figure 6:
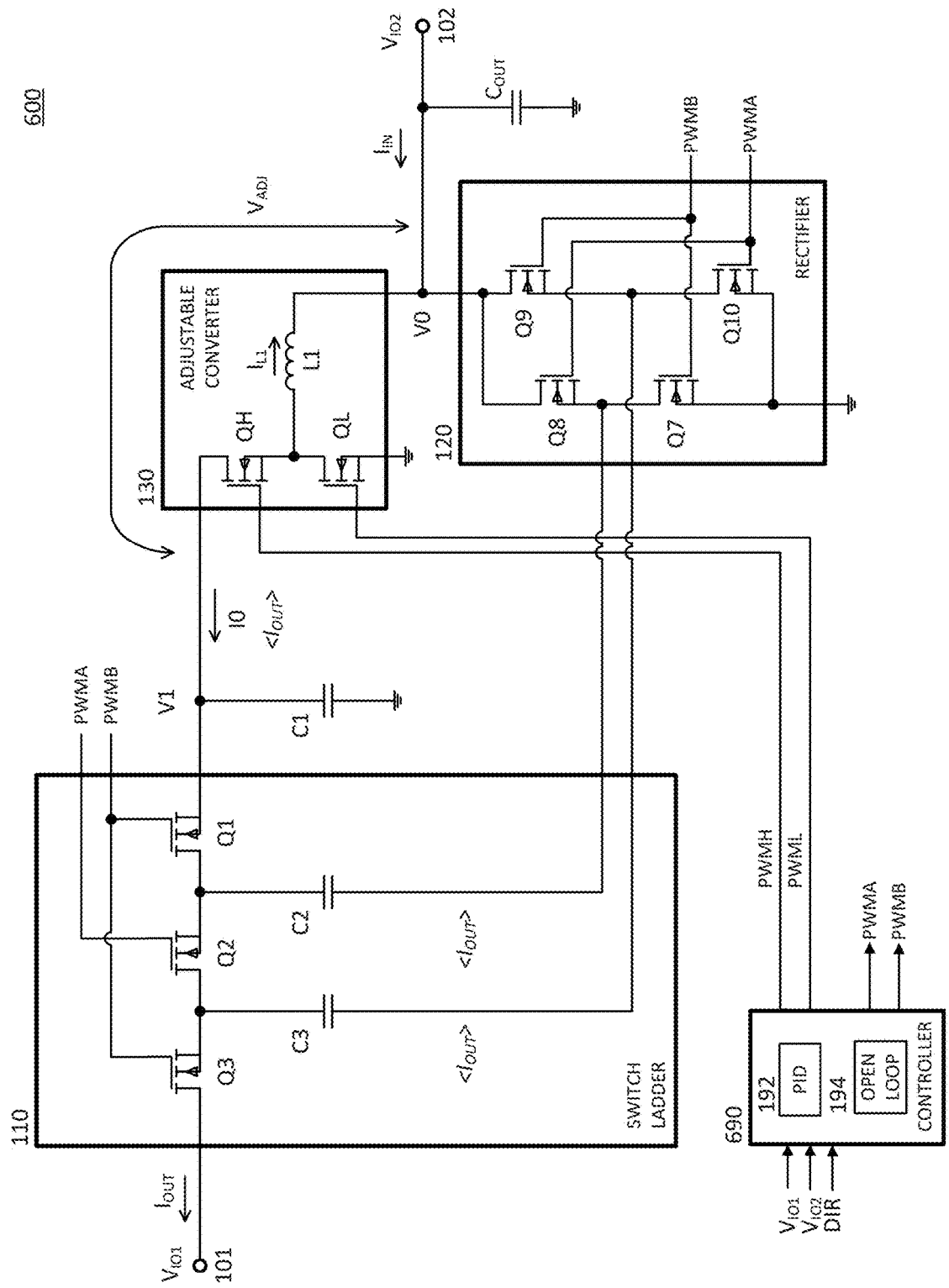
FIG. 6 illustrates a schematic diagram showing a regulated SCC in which power flows in an opposite direction to the power flow shown in FIG. 1.

In an alternative embodiment, there is no inverter 182 and the controller 190 generates separate signals for PWMH and PWMHL, rather than the single control signal PWMHL as illustrated. Such an alternative allows support for discontinuous conduction mode (DCM), wherein both switches QH, QL may be turned off during periods of low current draw by the load, so as to avoid negative current $I_{L1}$ through the inductor L1. A configuration wherein the controller generates separate control signals PWMH, PWML is shown in FIGS. 3, 5, and 6. The control signals PWMH, PWML for the adjustable converter 130 are separate from, and may be generated independently of, the control signals PWMA, PWMB for the switch ladder 110 and the rectifier 120.

Figure 4C:
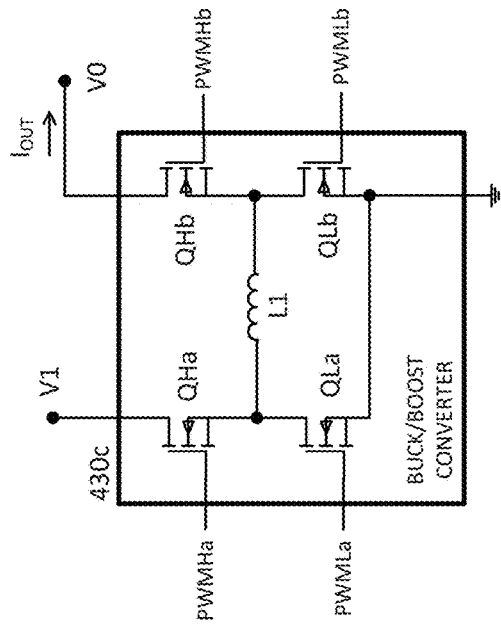
FIGS. 4A, 4B, and 4C illustrate schematic diagrams for adjustable converters, as may be used within a regulated SCC.
Figure 4A:
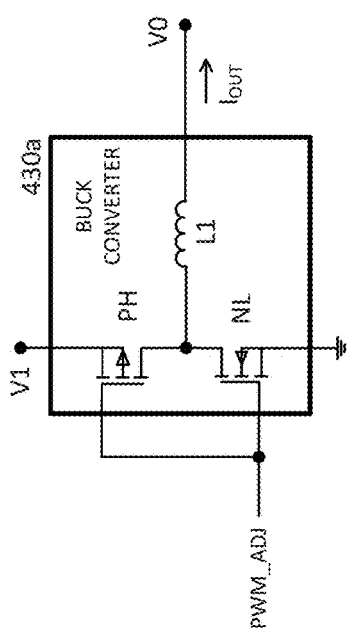
Figure 4B:
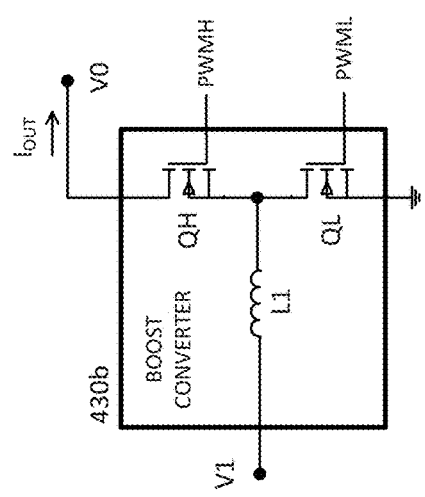

The buck converter illustrated in FIG. 1 is only one example of an adjustable converter. Additional types of adjustable converters are illustrated in FIGS. 4A, 4B, and 4C, and are described in conjunction with those figures.

The rectifier 120 couples the capacitors, sometimes termed 'legs,' of the switch ladder 110 to the second (output) terminal 102, and serves to provide the rectified output voltage $V_{OUT}$. The rectifier 120 comprises a first half bridge, including switches Q7 and Q8, which is coupled to the second capacitor C2, and a second half bridge, including switches Q9 and Q10, which is coupled to the third capacitor C3. The switches Q7 . . . Q10 of the rectifier 120 are controlled by the switch control signals PWMA, PWMB, which also control conductivity of the switches Q1, Q2, Q3 in the switch ladder 110. During the first time interval mentioned previously, switch Q9 is turned on while the capacitor C3 is charged via the third switch Q3, and a current flows to the output terminal 102 via the switch Q9. During the second time interval mentioned previously, switch Q10 is turned on and the capacitor C3 is discharged, via the second switch Q2, to the second capacitor C2. Thus, the second half bridge supplies current to the output terminal during the first time interval. The first half bridge operates in a complementary fashion, thereby supplying current, via the switch Q8, to the output terminal 102 during the second time interval. Hence, the rectifier 120 provides full-wave rectification, as current is supplied to the output terminal 102 during both the first and second time intervals, which represent substantially all of each switch period. An output capacitor $C_{OUT}$ smooths the output voltage $V_{OUT}$, so as to reduce ripple caused by switching of the rectifier 120, and to reduce voltage perturbations caused by load transients. Because operation of the rectifier 120 is similar to that of similar rectifiers within other SCCs, further description is not provided.

In a conventional 3:1 SCC, there is no adjustable converter and the steady-state average voltage $V_{C3}$ across the third capacitor C3 would be $V_{C3}=2*V_{OUT}$, and the steady-state average voltage $V_{C2}$ across the second capacitor C2 would be $V_{C2}=1*V_{OUT}$. Corresponding steady-state voltages for the variant SCC 100 are, instead:

$$V_{C3}=V_{IN}-V_{OUT},$$

$$V_{C2}=V_{IN}-2*V_{OUT},$$

wherein $V_{IN}$ is not necessary equal to $3*V_{OUT}$, i.e., $V_{IN}$ ≠ $3*V_{OUT}$ for nonzero $V_{ADJ}$. During the first time interval, with rectifier switch Q7 turned on, the second capacitor C2 is coupled to ground and the first capacitor C1 is charged, via the first switch Q1, to match the steady-state voltage, $V_{C2}=V_{IN}-2*V_{OUT}$, across the second capacitor C2. The voltage $V1=V_{IN}-2*V_{OUT}$ is then available to supply the adjustable converter 130.

The switches within the illustrated variant SCC 100 of FIG. 1 are power metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The switches of the adjustable converter 130 may be of a same or different type than the switches of the switch ladder 110 or the rectifier 120. While they typically have the same switch type, the switches Q1, Q2, Q3 of the switch ladder may be sized differently, so as to accommodate different voltage and/or current requirements at the different stages, particularly during startup. The switches may be integrated on the same semiconductor die, may each be provided on separate dies, or may otherwise be spread across a plurality of semiconductor dies. Each of the MOSFET switches within the SCC 100 has a drain and a source terminal, as well as a gate terminal that controls conductivity between the drain and source terminals. Gate drivers are typically included to translate digital control signals, such as PWMA, PWMB, PWMH, PWML, to voltage levels appropriate for driving a control terminal (e.g., gate) for each of the switches. For ease of illustration, switch drivers are not shown for the switches of the variant SCC 100.

The controller 190 comprises an open-loop controller 194 and a closed-loop controller 192. The open-loop controller generates the switch control signal PWMAB, which is also denoted PWMA and which is inverted by inverter 184 so as to generate the switch control signa PWMB. The switch control signals PWMA, PWMB control switch conductivity within the switch ladder 110 and the rectifier 120. These switch control signals are typically pulse-width-modulated (PWM) waveforms having a fixed frequency and a duty cycle of approximately 50%.

The closed-loop controller 192, which may include, e.g., a proportional-integral-derivative (PID) controller, generates the high and low-side switch control signals PWMH, PWML, so as to provide a regulated output voltage $V_{OUT}$ at the output of the adjustable controller 130. A sensed version of the output voltage $V_{OUT}$ is provided to the controller 190, so that the closed-loop controller 192 may adjust the switch control signal PWMHL, e.g., by adjusting a PWM duty cycle, so as to maintain the output voltage $V_{OUT}$ near a desired target voltage, even as the input voltage $V_{IN}$ or load current $I_{OUT}$ varies. The input voltage $V_{IN}$ may optionally be used by the controller 190, e.g., to provide feed forward control, for the described power flow direction.

The closed-loop controller 192 may not be included in some variants. For example, the variant SCC 100 may not need to provide a regulated output voltage $V_{OUT}$, but may need to provide voltage step-down that is not an integral ratio, e.g., a 3.5:1 ratio may be desired. For such a case, the switch control signal PWMHL (or PWMH, PWML) may be generated by an open-loop controller.

The open and closed-loop controllers 194, 192 need not be within the same controller 190, as illustrated. For example, the closed-loop controller 192 may be part of the adjustable converter 130 and may generate its switch control signals PWMH, PWML independently of the controller 190.

The controller 190 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 190 may also include memory, e.g., non-volatile memory such as flash, that includes instructions or data for use by the processor circuitry, and one or more timers, e.g., for generating the first and second conduction intervals according to a switching frequency, and dead time intervals.

With a buck converter as the adjustable converter 130, the average inductor current $I_{L1}$ is related to the buck converter input current I0 as $\langle I_{L1}\rangle = \langle I0\rangle/d$, where d is the duty cycle corresponding to the on intervals for the high-side switch QH. The average output current $I_{OUT}$ of the variant SCC 100 is thus given by:

$$\langle I_{OUT}\rangle = (N-1)\langle I_{IN}\rangle + \frac{\langle I0\rangle}{d}, \qquad (1)$$

which, with $\langle I0\rangle = \langle I_{IN}\rangle$, provides the following current gain:

$$Igain = \frac{\langle I_{OUT}\rangle}{\langle I_{IN}\rangle} = (N-1) + \frac{1}{d}, \qquad (2)$$

where N is the number of switches in the switch ladder. If the duty cycle d is close to 100%, e.g., 90%, the gain simplifies to approximately Igain≈N, and the current $I_{L1}$ through the adjustable converter 130 is approximated as $1/N^{th}$ of the output current $I_{OUT}$. Note that the reduced current of the adjustable converter 130 depends upon its topology. Whereas the buck converter gives a current reduction of something less than 1/N, a boost converter would provide a current reduction of something over 1/N. This is further addressed in the descriptions of FIGS. 4A, 4B, and 4C.

While the above describes a power flow from the first terminal 101 to the second terminal 102, the power flow could be reversed in which case the variant SCC would perform a voltage step-up, and in which case the voltage at the first terminal 101 may be an output voltage that is to be regulated. Such a configuration is described further in conjunction with FIG. 6.

Figure 2A:
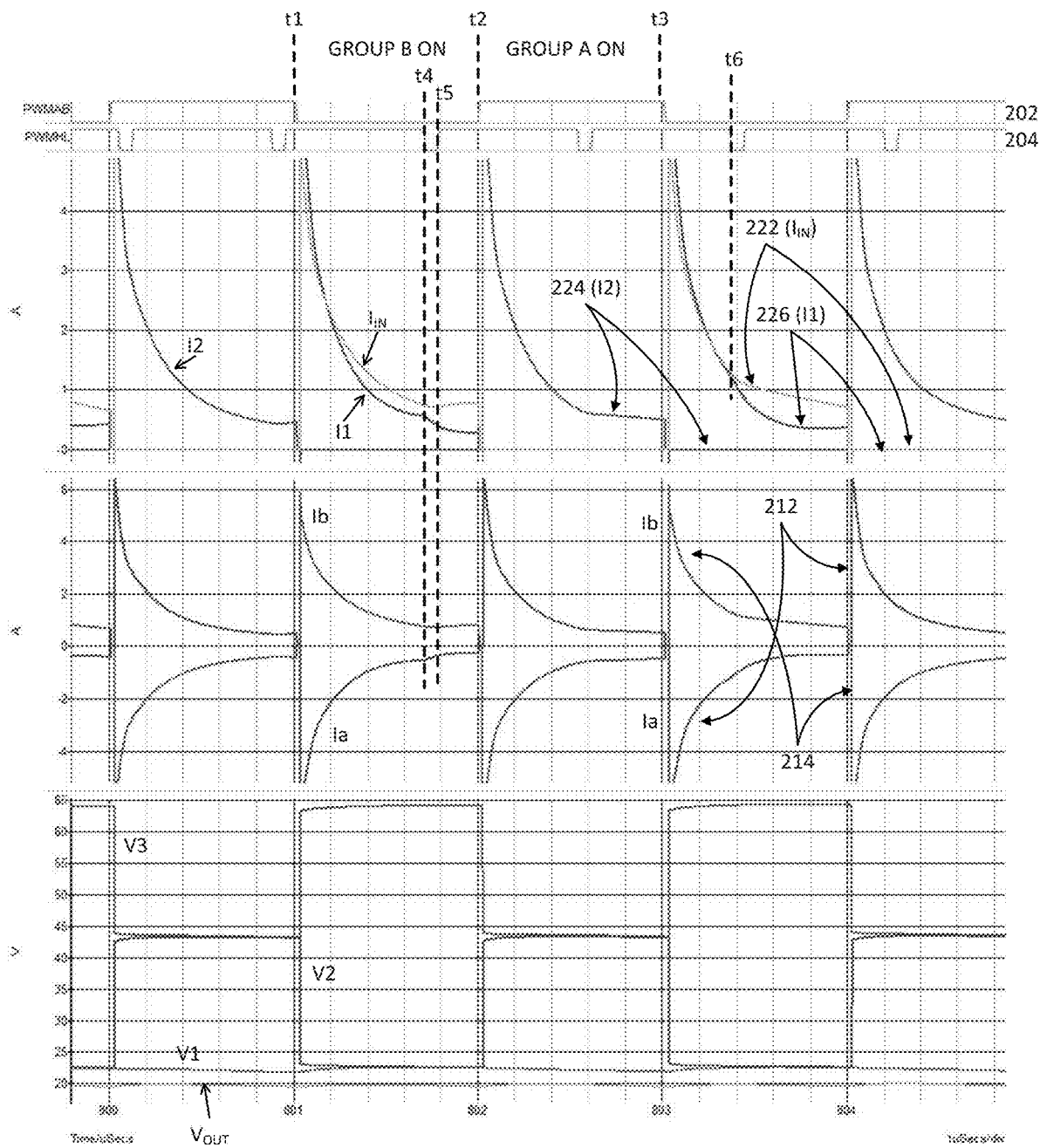
FIGS. 2A and 2B illustrate voltage and current waveforms corresponding to the regulated SCC of FIG. 1.
Figure 2B:
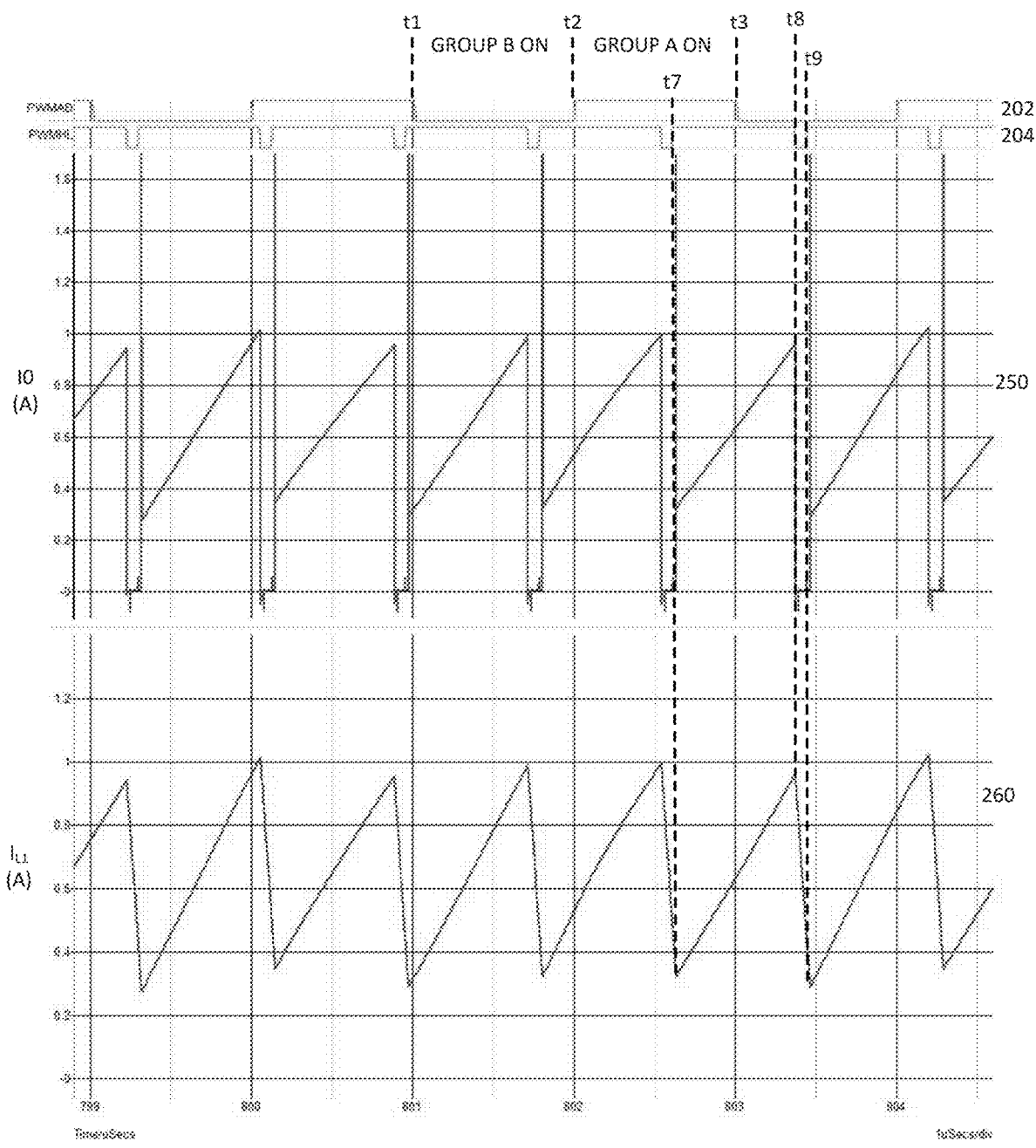

FIGS. 2A and 2B illustrate voltage and current waveforms corresponding to the operation of the variant SCC 100 of FIG. 1 under a certain set of operating conditions. These waveforms are provided and described merely to aid in the understanding of the variant SCC 100 of FIG. 1. The waveforms correspond to a steady-state operating condition of the variant SCC 100, after any startup transients (e.g., capacitor charging) have completed. These waveforms include switch control signals PWMAB, PWMHL; switch ladder currents $I_{IN}$, I2, I1; capacitor currents Ia, Ib; voltages V3, V2, V1, $V_{OUT}$ at various nodes of the variant SCC 100; and input and output currents I0, $I_{L1}$ of the adjustable converter 130.

The control signal PWMAB controls the switches Q1, Q2, Q3 of the switch ladder 110 and the switches Q7, . . . Q10 of the rectifier 120, and corresponds to the switch signals PWMA and PWMB shown in FIG. 1. When the control signal PWMAB is high, the switches Q2, Q8, Q10 of group A are turned on. When the control signal PWMAB is low, the switches Q1, Q3, Q7, Q9 of group B are turned on. Dead time is automatically inserted between the on interval for group A and the on interval for group B, so as to avoid cross conduction. The illustrated waveform 202 for control signal PWMAB has a frequency of 500 kHz and a duty cycle of approximately 50%.

The control signal PWMHL controls the switches QH, QL of the adjustable converter 130, which is a buck converter in FIG. 1. The high-side switch QH is turned on when the control signal PWMHL is high, and the low-side switch QL is turned on when the control signal PWMHL is low. (Dead time is automatically inserted between the on interval for the high-side switch QH and the on interval for the low-side switch QL, so as to avoid cross conduction.) The illustrated control signal PWMHL has a frequency of 1.2 MHz, and a duty cycle of about 90%, i.e., the high-side switch QH is turned on for 90% of each switch period, and the low-side switch QL is turned on for 10% of each switch period. Note that the frequency of the waveform 204 for control signal PWMHL (1.2 MHz) is independent and different from the frequency of the control signal PWMAB (500 KHz). The illustrated control signal PWMHL could be generated by a closed loop controller, e.g., the PID 192 of FIG. 1, thereby regulating the output voltage $V_{OUT}$ to approximately 20V under a condition when an attached load is sinking a relatively constant current. Alternatively, the waveform 204 of FIGS. 2A and 2B could correspond to a situation in which an open-loop controller is generating the control signal PWMHL, in which case the output voltage $V_{OUT}$ would be fixed at 90% of the buck converter input voltage V1, neglecting ripple and losses within the adjustable converter 130.

At time t1, the first time interval discussed previously begins, and the group B switches are turned on. When the third switch Q3 is turned on, the voltage V3 rises to the level of the input voltage $V_{IN}$, except for a small voltage drop across the third switch Q3. In the illustrated example, the input voltage $V_{IN}$, is about 65V and the voltage V3 rapidly rises to about 64V at time t1, after which it slowly rises to nearly 65V at time t2. Also at time t1, the first switch Q1 is turned on and the voltage V2 drops to match the voltage V1 at the input to the adjustable converter 130, wherein the voltage V1 is smoothed/stabilized by the first capacitor C1. During the interval between times t1 and t2, the voltage V2 is approximately 23V for the illustrated waveform. Also beginning at time t1, the voltage V1 rises slightly, e.g., from 22 to 23V, as energy from the second capacitor C2 charges the first capacitor C1 via the first switch Q1.

At time t2, the second time interval discussed previously begins, and the group A switch Q2 is turned on. With the nodes corresponding to voltages V3 and V2 coupled together, the voltage V3 falls and the voltage V2 rises until they are both approximately 44V. With the node having voltage V1 disconnected from the node having voltage V2, the voltage V1 slowly dissipates between times t2 and t3, as energy is drawn from the first capacitor C1 to provide current I0 to the adjustable converter 130.

Throughout the switch cycle between times t1 and t2 (and elsewhere), the output voltage $V_{OUT}$ varies within a narrow range around its target value of 20V, e.g., between about 19.5V to 20V. In a more typical circuit, a larger output capacitor would be used (dependent upon the load variation) such that the ripple would be well below 1%, and preferably within 0.1% to 0.5%, of the target voltage. (The capacitor $C_{OUT}$ used in the circuit for generating the waveform $V_{OUT}$ in FIG. 2A has a capacitance of 1 µF, so that some ripple can be discerned in FIG. 2A.)

Waveforms 212, 214 correspond to currents Ib, Ia flowing, respectively, to the third and second capacitors C3, C2. At time t1 with switch Q3 turned on, the current Ib flowing to capacitor C3 spikes to around 6 A, and then decays until time t2 when the switch Q3 is turned off. At time t2 with switch Q3 off and switch Q2 on, positive current flows from the third capacitor C3 to the second capacitor C2. This is illustrated, at time t2, as a negative current spike (around −6 A) for Ib, and a corresponding positive current spike (+6 A) for Ia. These current magnitudes decay to more stable magnitudes until time t3, when switch Q2 is turned off. Also at time t3, switch Q1 is turned on, such that current (and energy) flows from capacitor C2 to capacitor C1. This is illustrated as a negative current spike (approximately −6 A) on the waveform 212 for the current Ia. Furthermore at time t3, switch Q3 is turned on, such that current positive current Ia flows from the first terminal 101, in the same manner as at time t1.

Also illustrated are waveforms 222, 224, 226 corresponding, respectively, to the input current $I_{IN}$, which flows through the third switch Q3, the current I2 through the second switch Q2, and the current I1 through the first switch Q1. During the interval between times t1 and t2, the input current $I_{IN}$ flows to the third capacitor C3 through the third switch Q3, and can be seen to be substantially the same as the current Ib during this interval. Between times t2 and t3, the third switch Q3 is turned off such that there is no input current $I_{IN}$, as shown in the waveform 222. Also during the interval between times t1 and t2, current I1 flows through the first switch Q1, as illustrated in the waveform 226. During this period, current I1 is substantially the same as the current Ia of the second capacitor C2, except for a reversed polarity.

During the interval between times t2 and t3, the second switch Q2 is turned on (switches Q3 and Q1 are off) and positive current I2 flows through this switch Q2. The current I2 is substantially the same as the current Ia and the negative of the current Ib during this interval.

As shown in the waveform 204 of the control signal PWMHL, the high-side switch QH is turned off between times t4 and t5. (The low-side switch QL is turned on during this period.) Because no current I0 is being sunk by the adjustable converter 130 during this interval, the current I1 through the first switch Q1 drops off slightly at time t4, relative to what it would otherwise be. (Similarly, the magnitude of the current Ia from the second capacitor C2 also drops slightly at time t4.) This phenomena may also be observed at other times when the group B switches are on and the high-side switch QH is turned off, e.g., the current I1 can also be seen to fall off more quickly at time t6.

FIG. 2B illustrates waveforms 250, 260 corresponding to the input current I0 and the inductor current $I_{L1}$ of the adjustable converter 130. These currents I0, $I_{L1}$ are primarily determined by the switch control signal PWMHL, having the illustrated waveform 204. The inductor current $I_{L1}$ has the typical triangular pattern for buck converter current. For example, between times t7 and t8, the high-side switch QH is turned on and the inductor current $I_{L1}$ increases linearly, as shown in waveform 260, thereby creating a voltage $V_{ADJ}$ across the adjustable converter 130 that is determined by the slope of the inductor current $I_{L1}$ and an inductance of L1. Between times t8 and t9, the low-side switch QL is turned on and the inductor current $I_{L1}$ decreases linearly.

The current I0 flowing into the adjustable converter 130 is shown in the waveform 250. This current I0 basically follows the inductor current $I_{L1}$, except for intervals when the high-side switch QH is turned off, e.g., between times t8 and t9. During such intervals, no current I0 flows into the adjustable converter 130.

The waveforms of FIGS. 2A and 2B correspond to a circuit such as that of FIG. 1 wherein capacitors C1, C2, and C3 have capacitances of 500 nF, and the inductor L1 is 2.7 µH.

Variant Switched-Capacitor Converters with Other Step-Down Ratios

The circuit topology illustrated in FIG. 1 may be modified to provide different down-conversion ratios. For example, a 2:1 step-down converter could be created by deleting the third switch Q3, the third capacitor C3, and the second half bridge (switches Q9, Q10). Unlike the SCC 100 of FIG. 1, such a converter would only have a half-wave rectifier (switches Q7, Q8) at its output, and would thus be subject to more ripple, which may limit the utility of such a converter. Furthermore, a primary advantage of the circuit topologies provided herein is to provide relatively small currents through an inductor of an adjustable converter. A variant SCC with two switches in its switch ladder would provide a nominal step-down ratio of 2:1, and the inductor current would only be reduced by approximately a factor of 2 relative to a conventional buck converter. Because the inductor current represents approximately $1/N^{th}$ of the overall output current for the variant SCCs described herein, wherein N is the number of switches (and the nominal step-down ratio), the inductor current is preferably reduced by having a larger number of switches and an associated larger step-down ratio. Such a converter is illustrated in FIG. 3. (The current reduction 1/N depends upon the type of adjustable converter in use. For a buck converter, the current reduction will be something less than 1/N, whereas for a boost converter it will be something over 1/N.)

FIG. 3 illustrates a variant SCC 300 having a step-down ratio of X:1, where X≥6 and, typically, is between 6 and 7. The variant SCC 300 of FIG. 3 has a similar circuit structure to that of FIG. 1, and only substantive differences are described below.

The switch ladder 310 includes 6 switches and 5 capacitors, thereby yielding a down conversion ratio of 6:1 or greater. Each of the linking capacitors C2 . . . C6 supplies, on average, about $1/X^{th}$ of the output current $I_{OUT}$, such that the switch ladder 310 and the rectifier 120 provide about $5/X^{th}$ of the output current $I_{OUT}$. The adjustable converter 130, hence, only needs to supply an average of about $1/X^{th}$ of the output current $I_{OUT}$. The low current through the adjustable converter 130, and its inductor L1, means that the inductor L1 may be relatively small and that the power loss of the inductor L1 will be relatively low. This represents an advantage over the variant SCC 100 of FIG. 1.

While the topology of the rectifier 120 is the same as that illustrated in FIG. 1, the odd number (5) of capacitors C2 . . . C6 in the variant SCC 300 yields a current imbalance between the half bridges of the rectifier 120. The first half bridge, which comprises switches Q7 and Q8, is fed by three capacitors (C6, C4, C2), thereby supporting $3/X^{th}$ of the output current. The second half bridge, which comprises switches Q9 and Q10, is fed by two capacitors (C5, C3), thereby supporting $2/X^{th}$ of the output current. This imbalance will cause additional ripple in the output voltage $V_{OUT}$, at least as compared with a balanced current from the capacitors (legs) of the switch ladder 310. For some applications, and particularly for switch ladders having a relatively few number of switches, it may be preferable for the switch ladder to include an odd number of switches and an even number of capacitors, so as to reduce current imbalance through half bridges of the rectifier. Additionally, the imbalance may mean that different switches may be needed in the half bridges, since they are supporting different current levels. Alternatively, the rectifier may include more than two half bridges, e.g., one half bridge for each capacitor (leg) of the switch ladder, which would evenly distribute the current load among the half bridges and allow for similarly-sized switches throughout the rectifier.

Otherwise, operation of the variant SCC 300 is similar to that illustrated in FIG. 1 and, hence, further explanation is not provided.

Alternative Adjustable Converters

The adjustable converter 130 of FIG. 1 is a buck converter comprised of a half bridge and an inductor, but it should be appreciated that other converters, buck or otherwise, may be used in place of the adjustable converter 130 of FIG. 1. Several alternatives for the adjustable converter are described below.

The buck converter topology shown in FIG. 1 may be replaced with other buck converter circuits. For example, the low-side switch QL of the adjustable converter 130 may be replaced with a diode. This provides the advantage that only one switch control signal is required, but has the disadvantage that power losses are higher through a passive diode than an active rectification switch, such as the low-side switch QL of FIG. 1. Buck converters may be based upon circuit topologies other than that shown in the adjustable converter 130 of FIG. 1, but typically include an inductor and either two switches, or one switch and a diode.

FIG. 4A illustrates a buck converter 430a that is similar to the buck converter of the adjustable converter 130. However, the buck converter 430 of FIG. 4A includes a p-channel MOSFET PH for the high-side switch QH, and an n-channel MOSFET NL for the low-side switch QL. This may allow for simplified driver circuitry and a single switch control signal PWM_ADJ. Using a push-pull circuit of this type, however, removes the option of operating in DCM.

Regardless of the specific components and topology, buck converters provide the advantage of fast response time. For a system requiring tight regulation from a variant SCC, use of a buck converter is typically preferred, as they provide good performance in responding quickly to load transients. However, buck converters have the disadvantage that they may require a larger inductor than other switching converter types. Because buck converters are generally well known, further detail regarding their operation is not provided herein.

FIG. 4B illustrates a boost converter 430b, which has a topology similar to that of the buck converter 430a but in a reversed orientation, i.e., the input current flows through the inductor L1, and the output current flows through a half bridge comprised of high and low-side switches QH, QL. As compared to the buck converter 430a, the boost converter 430b carries a smaller current through its inductor L1 and, hence, its inductor may be smaller. The boost converter 430b relies upon the SCC ladder 110 and rectifier 100 to carry a larger portion of the output current $I_{OUT}$, as compared with a variant SCC using a buck converter. A boost converter, such as the boost converter 430b, has the disadvantage of providing a slower response to load transients than, e.g., a buck converter. Because boost converters are generally well known, further detail regarding their operation is not provided herein.

FIG. 4C illustrates a buck/boost converter 430c, which may be operated in a buck or boost mode, as determined by the switch control signals PWMHa, PWMLa, PWMHb, PWMLb. The buck/boost converter 430c comprises a first half bridge QHa, QLa configured much like the half bridge of the buck converter 430a, and a second half bridge QHb, QLb configured much like the half bridge of the boost converter 430b. When operated in buck mode, the switch control signals PWMHb, PWMLb are set to hold the high-side switch QHb on and the low-side switch QLb off, i.e., the boost portion is set to a pass-through mode. The switches QHa, QLa are controlled by the control signals PWMHa, PWMHa to provide the necessary output voltage $V_{OUT}$, in the same manner as described previously for a buck converter. When operated in boost mode, the switch control signals PWMHa, PWMLa are set to hold the high-side switch QHa on and the low-side switch QLa off, i.e., the buck portion is set to a pass-through mode. The switches QHb, QLb are controlled by the control signals PWMHb, PWMLb to provide the necessary output voltage $V_{OUT}$, in the same manner as described previously for a boost converter.

For the illustrated converters 430a, 430b, 430c or similar topologies, the high-side switches QH may be held on and the low-side switches QL may be turned off to effect a pass-through mode. Such a mode may be used, e.g., if a variant SCC falls out of regulation, or during startup up periods when the voltage V1 is not yet high enough to provide regulation.

Regulated Switched-Capacitor Converter with Buck/Boost Converter

FIG. 5 illustrates another variant SCC 500. This variant SCC differs from the previously-described variant SCCs in that the switch ladder 510 includes four switches and three capacitors, thereby leading to a nominal voltage down conversion of 4:1. A buck/boost converter 530, which may be similar to the buck/boost converter 430c described for FIG. 4C, is used as the adjustable converter. The controller 590 is configured to provide signals PWMHa, PWMLa, PWMHb, PWMLb for controlling the switches of the buck/boost converter 530.

As illustrated, an input voltage $V_{IN}$ of the variant SCC 500 is nominally 48V, and an output voltage $V_{OUT}$ is nominally 12V. Such a configuration is commonly used in server applications, wherein an unregulated 48V DC voltage is distributed, and must be down converted and potentially regulated to 12V, and in automotive applications.

If the input voltage $V_{IN}$ is sufficiently close to its nominal value of 48V and reasonably stable, the controller 590 may set the buck/boost converter 530 to a pass-through mode, in which no regulation is performed. Should the controller 590 detect that the output voltage $V_{OUT}$ drops too far below its 12V target, or similarly that the input voltage $V_{IN}$ drops too much, the controller 590 converts to operating the buck/boost converter 530 in a boost operational mode, so as to regulate the output voltage $V_{OUT}$. Should the controller 590 detect that the output voltage $V_{OUT}$ rises too far above its 12V target, or similarly that the input voltage $V_{IN}$ rises too much, the controller 590 converts to operating the buck/boost converter 530 in a buck operational mode, so as to regulate the output voltage $V_{OUT}$. Provided that the expected range of the input voltage $V_{IN}$ is sufficiently constrained, the variant SCC 500 advantageously provides a voltage down conversion (current up conversion), while requiring a fairly small inductor in the buck/boost converter 530 and providing reasonable response time to transients.

Bi-Directional Regulated Switched-Capacitor Converter

The variant SCCs described previously presume operation in which power flows from the first terminal 101 to the second terminal 102, so as to down convert a voltage. The variant SCC circuit topology also supports power flow in the opposite direction, so as to provide voltage up conversion. Such operation is illustrated in FIG. 6.

FIG. 6 illustrates a variant SCC 600 having circuitry that is similar to that illustrated in FIG. 1. However, the first terminal 101 serves as an output terminal, which may be connected to a load, and the second terminal 102 serves as an input terminal for connecting to a power supply.

The controller 690 is configured to input a direction control signal DIR, which determines the operational mode of the variant SCC 600. Should the direction DIR indicate a voltage down conversion, the voltage $V_{IO2}$ at the second terminal 102 is treated as an output voltage, and the switch control signals PWMH, PWML are controlled so as to regulate this voltage $V_{IO2}$ appropriately, as described previously. If, however, the direction DIR indicates a voltage up conversion and power flow from the second terminal 102 to the first terminal 101, the voltage $V_{IO1}$ at the first terminal 101 is treated as an output voltage, and the switch control signals PWMH, PWML are controlled so as to regulate this voltage $V_{IO1}$ at a desired target voltage.

Note that a device connected to the first terminal 101 of the variant SCC 600 may operate as a power supply in some modes, and as a load in other modes. For example, the device connected to this first terminal 101 may be a battery that provides power to the variant SCC 600 for some time period, and is charged by the variant SCC 600 in another time period. Similarly, the second terminal 102 may likewise be connected to a device that sometimes operates as a load and sometimes operates as a supply, e.g., a motor/generator.

Method for Controlling a Regulated Switched-Capacitor Converter

Figure 7:
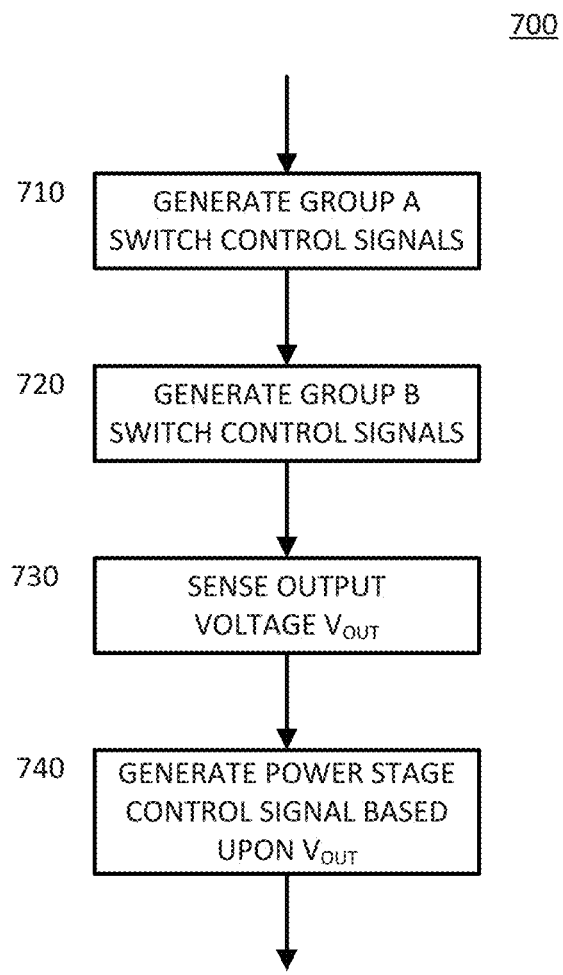
FIG. 7 illustrates a method for controlling a regulated SCC.

FIG. 7 illustrates a method 700 for controlling a variant SCC, such as any of the variant SCCs described above. This method may be implemented within a controller of a variant SCC, such as the controller shown in FIG. 1, or similar.

The method 700 begins with a step of generating 710 control signals for switches within a group 'A' of the variant SCC. The method continues by generating 720 control signals for switches within a group 'B.' While shown as separate steps, it should be understood that the control signals for group 'B' may be derived from the control signals of group 'A,' or vice versa. The method continues by sensing 730 an output voltage $V_{OUT}$ of the variant SCC, and generating 740 power-stage control signals based upon the output voltage $V_{OUT}$. In a typical embodiment, the power-stage control signals control switches within an adjustable converter, such as a buck, boost, or buck/boost converter. In one embodiment, the output voltage $V_{OUT}$ may be regulated by the generated power-stage control signals. In another embodiment, the output voltage $V_{OUT}$ might not be regulated, such that a fixed voltage down conversion is achieved. Such an embodiment may not require the step of sensing 730 the output voltage $V_{OUT}$. The steps of the method 700 are typically repeated while the variant SCC is in operation.

Although the present disclosure is not so limited, the following numbered examples demonstrate one or more aspects of the disclosure.

Example 1

A regulated switched-capacitor converter (SCC) that includes first and second I/O terminals, a rectifier coupled to the second I/O terminal, a first capacitor coupled between a first voltage node and a ground reference, a switch ladder, and a variable-voltage converter. The switch ladder is coupled between the first I/O terminal and the first voltage node, and comprises first and second switches, and a second capacitor. The first switch is coupled to the first capacitor at a first voltage node. The second switch is coupled to the first switch at a second voltage node, and is further coupled between the first I/O terminal and the first switch. The second capacitor is coupled between the second voltage node and a node of the rectifier. The variable-voltage converter is coupled between the first voltage node and the second I/O terminal, and is configured to provide a variable voltage drop therebetween. In preferred embodiments, the variable-voltage switching converter includes a switching power stage and an inductor.

Example 2

The regulated SCC of example 1, wherein the variable-voltage switching converter is a buck converter configured to step down a first voltage of the first voltage node, and provide a resultant stepped-down voltage at the second I/O terminal, when the regulated SCC is operated in a mode wherein positive current flows into the first I/O terminal and out from the second I/O terminal.

Example 3

The regulated SCC of example 1, wherein the variable-voltage switching converter is a boost converter configured to step up a first voltage of the first voltage node, and provide a resultant stepped-up voltage at the second I/O terminal, when the regulated SCC is operated in a mode wherein positive current flows into the first I/O terminal and out from the second I/O terminal.

Example 4

The regulated SCC of example 1, wherein the variable-voltage switching converter is a buck/boost converter configured to operate in a first mode wherein a first voltage of the first voltage node is stepped down so as to provide a resultant stepped-down voltage at the second I/O terminal, and to operate in a second mode wherein the first voltage is stepped up so as to provide a resultant stepped-up voltage at the second I/O terminal, when the regulated SCC is operated in a mode wherein positive current flows into the first I/O terminal and out from the second I/O terminal.

Example 5

The regulated SCC of example 1, wherein the variable-voltage switching converter sets an average base current flowing into the variable-voltage switching converter from the first voltage node, and wherein the switch ladder and the rectifier supply a multiplied current to the second terminal, wherein the multiplied current has an average that is amplified by N relative to the average base current, wherein N is based on the number of switches in the switch ladder.

Example 6

The regulated SCC of example 1, wherein a first average current flows to the first terminal, a second average current flows from the second terminal, wherein the second average current is a factor of X higher than the first average current, and wherein X is greater than one and not an integer.

Example 7

The regulated SCC of example 1, wherein the switch ladder further comprises: a third switch coupled to the second switch at a third voltage node, and coupled between the first I/O terminal and the second switch; and a third capacitor coupled between the third voltage node and a second node of the rectifier.

Example 8

The regulated SCC of example 1, wherein the first I/O terminal is an input for coupling to a power source, the second I/O terminal is an output for coupling to a load, and an output voltage at the output is stepped down relative to an input voltage at the input.

Example 9

The regulated SCC of example 1, wherein the regulated SCC is configured to operate as a step-down converter during a first interval, in which positive current flows into the first I/O terminal and flows out from the second I/O terminal, and a voltage at the second I/O terminal is stepped down relative to a voltage at the first I/O terminal, and wherein the converter is configured to operate as a step-up converter during a second interval, in which positive current flows into the second I/O terminal and flows out from the first I/O terminal, and a voltage at the first I/O terminal is stepped up relative to a voltage at the second I/O terminal.

Example 10

A regulated SCC system comprising the regulated SCC of example 1 and a controller. The controller is configured to generate a first control signal for the first switch, a second control signal for the second switch, and a power-stage control signal for switching the power stage of the variable-voltage switching converter. The power-stage control signal may be used to control the variable voltage drop across the variable-voltage switching converter, and may be used to regulate an output voltage of the regulated SCC system.

Example 11

The regulated SCC system of example 10, wherein the variable-voltage switching converter comprises at least one of a buck converter, a boost converter, and a buck/boost converter, and the power-stage control signal controls conductivity of a switch within the power stage.

Example 12

The regulated SCC system of example 10, wherein the rectifier comprises a first half bridge comprising: a first rectifier switch having conductivity controlled by the second control signal; and a second rectifier switch having conductivity controlled by the first control signal.

Example 13

The regulated SCC system of example 10, wherein the controller further comprises: a closed-loop controller configured to generate the power-stage control signal; and an open-loop controller configured to generate the first and second control signals.

Example 14

The regulated SCC system of example 10, wherein a frequency of the first control signal differs from a frequency of the power-stage control signal.

Example 15

The regulated SCC system of example 10, wherein the first I/O terminal is an input for coupling to a power source, the second I/O terminal is an output for coupling to a load, and an output voltage at the output is stepped down relative to an input voltage at the input, and wherein the controller is further configured to: sense the output voltage at the second I/O terminal; and generate the power-stage control signal based upon the output voltage, so as to regulate the output voltage to a desired target voltage.

Example 16

The regulated SCC system of example 10, wherein the controller is configured to: operate the regulated SCC system as a step-down converter during a first interval, in which positive current flows into the first I/O terminal and flows out from the second I/O terminal, a voltage at the second I/O terminal is stepped down relative to a voltage at the first I/O terminal, and the power-stage control signal is generated so as to regulate the voltage at the second I/O terminal; and operate the regulated SCC system as a step-up converter during a second interval, in which positive current flows into the second I/O terminal and flows out from the first I/O terminal, a voltage at the first I/O terminal is stepped up relative to a voltage at the second I/O terminal, and the power-stage control signal is generated so as to regulate the voltage at the first I/O terminal.

Example 17

A method for controlling a regulated SCC that comprises first and second input/output (I/O) terminals, a rectifier coupled to the second I/O terminal, a first capacitor coupled between a first voltage node and a reference voltage, a switch ladder, and a variable-voltage switching converter. The switch ladder includes first and second switches that are coupled between the first I/O terminal and the first voltage node, and a second capacitor, which couples an interconnection node of the first and second switches to a first node of the rectifier. The variable-voltage switching converter comprises a power stage and an inductor, and is coupled between the first voltage node and the second I/O terminal. The method comprises generating a first control signal for controlling conductivity of the first switch, generating a second control signal for controlling conductivity of the second switch, and generating a power-stage control signal for controlling conductivity of the power stage. The generated power-stage control signal may be used to regulate an output voltage of the regulated SCC.

Example 18

The method of example 17, further comprising sensing a second voltage at the second I/O terminal, and wherein the power-stage control signal is generated based upon the sensed second voltage, so as to regulate the second voltage to a desired target voltage.

Example 19

The method of example 17, further comprising: operating the regulated SCC as a step-down converter during a first interval, in which positive current flows into the first I/O terminal and flows out from the second I/O terminal, a voltage at the second I/O terminal is stepped down relative to a voltage the first I/O terminal, and the power-stage control signal is generated so as to regulate the voltage at the second I/O terminal; and operating the regulated SCC as a step-up converter during a second interval, in which positive current flows into the second I/O terminal and flows out from the first I/O terminal, a voltage at the first I/O terminal is stepped up relative to a voltage the second I/O terminal, and the power-stage control signal is generated so as to regulate the voltage at the first I/O terminal.

As used herein, the terms "having," "containing," "including," "comprising," and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A regulated switched-capacitor converter (SCC), comprising:
   a first input/output (I/O) terminal;
   a second I/O terminal;
   a rectifier coupled to the second I/O terminal;
   a first capacitor coupled between a first voltage node and a reference node;
   a switch ladder coupled between the first I/O terminal and the first voltage node, and comprising:
      a first switch coupled to the first voltage node,
      a second switch coupled to the first switch at a second voltage node, and coupled between the first I/O terminal and the second voltage node, and
      a second capacitor coupled between the second voltage node and a first node of the rectifier;
   a variable-voltage switching converter coupled between the first voltage node and the second I/O terminal and configured to provide a variable voltage drop between the first voltage node and the second I/O terminal, the variable-voltage switching converter comprising a power stage and an inductor.

2. The regulated SCC of claim 1, wherein the variable-voltage switching converter is a buck converter configured to step down a first voltage of the first voltage node, and provide a resultant stepped-down voltage at the second I/O terminal, when the regulated SCC is operated in a mode wherein positive current flows into the first I/O terminal and out from the second I/O terminal.

3. The regulated SCC of claim 1, wherein the variable-voltage switching converter is a boost converter configured to step up a first voltage of the first voltage node, and provide a resultant stepped-up voltage at the second I/O terminal, when the regulated SCC is operated in a mode wherein positive current flows into the first I/O terminal and out from the second I/O terminal.

4. The regulated SCC of claim 1, wherein the variable-voltage switching converter is a buck/boost converter configured to operate in a first mode wherein a first voltage of the first voltage node is stepped down so as to provide a resultant stepped-down voltage at the second I/O terminal, and to operate in a second mode wherein the first voltage is stepped up so as to provide a resultant stepped-up voltage at the second I/O terminal, when the regulated SCC is operated in a mode wherein positive current flows into the first I/O terminal and out from the second I/O terminal.

5. The regulated SCC of claim 1, wherein the variable-voltage switching converter sets an average base current flowing into the variable-voltage switching converter from the first voltage node, and wherein the switch ladder and the rectifier supply a multiplied current to the second terminal, wherein the multiplied current has an average that is amplified by N relative to the average base current, wherein N is based on the number of switches in the switch ladder.

6. The regulated SCC of claim 1, wherein a first average current flows to the first terminal, a second average current flows from the second terminal, wherein the second average current is a factor of X higher than the first average current, and wherein X is greater than one and not an integer.

7. The regulated SCC of claim 1, wherein the switch ladder further comprises:
a third switch coupled to the second switch at a third voltage node, and coupled between the first I/O terminal and the second switch; and
a third capacitor coupled between the third voltage node and a second node of the rectifier.

8. The regulated SCC of claim 1, wherein the first I/O terminal is an input for coupling to a power source, the second I/O terminal is an output for coupling to a load, and an output voltage at the output is stepped down relative to an input voltage at the input.

9. The regulated SCC of claim 1,
wherein the regulated SCC is configured to operate as a step-down converter during a first interval, in which positive current flows into the first I/O terminal and flows out from the second I/O terminal, and a voltage at the second I/O terminal is stepped down relative to a voltage at the first I/O terminal, and
wherein the converter is configured to operate as a step-up converter during a second interval, in which positive current flows into the second I/O terminal and flows out from the first I/O terminal, and a voltage at the first I/O terminal is stepped up relative to a voltage at the second I/O terminal.

10. A regulated switched-capacitor converter (SCC) system, comprising:
a first input/output (I/O) terminal;
a second I/O terminal;
a rectifier coupled to the second I/O terminal;
a first capacitor coupled between a first voltage node and a reference node;
a switch ladder coupled between the first I/O terminal and the first voltage node, and comprising:
a first switch coupled to the first voltage node,
a second switch coupled to the first switch at a second voltage node, and coupled between the first I/O terminal and the second voltage node, and
a second capacitor coupled between the second voltage node and a first node of the rectifier;
a variable-voltage switching converter coupled between the first voltage node and the second I/O terminal and configured to provide a variable voltage drop between the first voltage node and the second I/O terminal, the variable-voltage switching converter comprising a power stage and an inductor; and
a controller configured to generate a first control signal for the first switch, a second control signal for the second switch, and a power-stage control signal for the power-stage.

11. The regulated SCC system of claim 10, wherein the variable-voltage switching converter comprises at least one of a buck converter, a boost converter, and a buck/boost converter, and the power-stage control signal controls conductivity of a switch within the power stage.

12. The regulated SCC system of claim 10, wherein the rectifier comprises a first half bridge comprising:
a first rectifier switch having conductivity controlled by the second control signal; and
a second rectifier switch having conductivity controlled by the first control signal.

13. The regulated SCC system of claim 10, wherein the controller further comprises:
a closed-loop controller configured to generate the power-stage control signal; and
an open-loop controller configured to generate the first and second control signals.

14. The regulated SCC system of claim 10, wherein a frequency of the first control signal differs from a frequency of the power-stage control signal.

15. The regulated SCC system of claim 10, wherein the first I/O terminal is an input for coupling to a power source, the second I/O terminal is an output for coupling to a load, and an output voltage at the output is stepped down relative to an input voltage at the input, and wherein the controller is further configured to:
sense the output voltage at the second I/O terminal; and
generate the power-stage control signal based upon the output voltage, so as to regulate the output voltage to a desired target voltage.

16. The regulated SCC system of claim 10, wherein the controller is configured to:
operate the regulated SCC system as a step-down converter during a first interval, in which positive current flows into the first I/O terminal and flows out from the second I/O terminal, a voltage at the second I/O terminal is stepped down relative to a voltage at the first I/O terminal, and the power-stage control signal is generated so as to regulate the voltage at the second I/O terminal; and
operate the regulated SCC system as a step-up converter during a second interval, in which positive current flows into the second I/O terminal and flows out from the first I/O terminal, a voltage at the first I/O terminal is stepped up relative to a voltage at the second I/O terminal, and the power-stage control signal is generated so as to regulate the voltage at the first I/O terminal.

17. A method for controlling a regulated switched-capacitor converter (SCC) that comprises first and second input/output (I/O) terminals, a rectifier coupled to the second I/O terminal, a first capacitor coupled between a first voltage node and a reference voltage, a switch ladder comprising first and second switches coupled between the first I/O terminal and the first voltage node and a second capacitor coupling an interconnection node of the first and second switches to a first node of the rectifier, and a variable-voltage switching converter comprising a power stage and an inductor and coupled between the first voltage node and the second I/O terminal, the method comprising:

generating a first control signal for controlling conductivity of the first switch;

generating a second control signal for controlling conductivity of the second switch; and generating a power-stage control signal for controlling conductivity of the power stage.

18. The method of claim 17, further comprising:

sensing a second voltage at the second I/O terminal, and wherein the power-stage control signal is generated based upon the sensed second voltage, so as to regulate the second voltage to a desired target voltage.

19. The method of claim 17, further comprising:

operating the regulated SCC as a step-down converter during a first interval, in which positive current flows into the first I/O terminal and flows out from the second I/O terminal, a voltage at the second I/O terminal is stepped down relative to a voltage the first I/O terminal, and the power-stage control signal is generated so as to regulate the voltage at the second I/O terminal; and operating the regulated SCC as a step-up converter during a second interval, in which positive current flows into the second I/O terminal and flows out from the first I/O terminal, a voltage at the first I/O terminal is stepped up relative to a voltage the second I/O terminal, and the power-stage control signal is generated so as to regulate the voltage at the first I/O terminal.

* * * * *

UNITED STATES PATENT AND TRADEMARK OFFICE
CERTIFICATE OF CORRECTION

PATENT NO. : 10,587,189 B1  
APPLICATION NO. : 16/380409  
DATED : March 10, 2020  
INVENTOR(S) : P. Ausseresse Page 1 of 1

It is certified that error appears in the above-identified patent and that said Letters Patent is hereby corrected as shown below:

In the Claims

Column 22, Line 6 (Claim 19, Line 6), please change "voltage the" to -- voltage at the --.

Column 22, Line 14 (Claim 19, Line 14), please change "voltage the" to -- voltage at the --.

Signed and Sealed this  
Nineteenth Day of May, 2020

Andrei Iancu  
*Director of the United States Patent and Trademark Office*